(12) United States Patent
Krishnan et al.

(10) Patent No.: US 6,222,856 B1
(45) Date of Patent: Apr. 24, 2001

(54) ADAPTIVE BANDWIDTH THROTTLING FOR INDIVIDUAL VIRTUAL SERVICES SUPPORTED ON A NETWORK SERVER

(76) Inventors: Murali R. Krishnan, 13801 Old Redmond Rd. #D207, Redmond, WA (US) 98052; Bilal Alam, 52 Amherst Dr., Kitchener, Ontario (CA), N2P 1C9

( * ) Notice: Subject to any disclaimer, the term of this patent is extended or adjusted under 35 U.S.C. 154(b) by 0 days.

(21) Appl. No.: 08/919,633

(22) Filed: Aug. 28, 1997

Related U.S. Application Data

(63) Continuation-in-part of application No. 08/674,684, filed on Jul. 2, 1996, now Pat. No. 5,799,002.

(51) Int. Cl.$^7$ .................................................. H04J 3/16
(52) U.S. Cl. ........................... 370/468; 370/464; 370/465
(58) Field of Search .................................... 370/465, 468, 370/230, 234, 232, 235, 229, 231; 395/200.65, 200.59

(56) References Cited

U.S. PATENT DOCUMENTS

| | | | |
|---|---|---|---|
| 4,914,650 | 4/1990 | Sriram | 370/60 |
| 5,231,631 | * 7/1993 | Bhurke | 370/230 |
| 5,280,470 | * 1/1994 | Bhurke | 370/468 |
| 5,313,454 | 5/1994 | Bustini et al. | 370/13 |
| 5,359,320 | 10/1994 | Jaffe et al. | 340/825.5 |
| 5,381,413 | * 1/1995 | Tobagi | 370/468 |
| 5,418,782 | * 5/1995 | Wasilewski | 370/486 |
| 5,432,787 | 7/1995 | Chethik . | |
| 5,477,542 | 12/1995 | Takahara et al. | 370/94.1 |
| 5,701,465 | * 12/1997 | Baugher | 370/231 |
| 5,748,900 | * 5/1998 | Scott | 395/200.65 |
| 5,778,222 | * 7/1998 | Herrick | 707/9 |

* cited by examiner

Primary Examiner—Douglas W. Olms
Assistant Examiner—Ricardo M. Pizarro
(74) Attorney, Agent, or Firm—Lee & Hayes, PLLC

(57) ABSTRACT

A bandwidth throttling system is implemented on a server network connected to a computer network system to serve one or more clients over a network. The network server supports a service that presents multiple virtual services that can be individually requested by the clients. The bandwidth throttling system controls bandwidth on a per virtual service basis. The bandwidth throttling system has a measuring subsystem to measure the amount of bandwidth being used by each virtual service supported by the network server. The bandwidth throttling system also has a control subsystem to selectively throttle requests for a particular virtual service independently of others based upon the bandwidth used by the particular virtual service. The bandwidth throttling system utilizes an adaptive, hierarchical throttling strategy that is applied to each virtual service independently. The bandwidth throttling system compares the bandwidth usage for the virtual service against the administrator-defined thresholds for that virtual service. If the presently used bandwidth exceeds a first threshold, a first set of throttling actions is applied. If the presently used bandwidth exceeds a second threshold greater than the first threshold, a different second set of throttling actions is applied. In this manner, the administrator is given maximum control at setting throttling policies for each individual virtual service independently of other virtual services.

30 Claims, 10 Drawing Sheets

ADAPTIVE BANDWIDTH THROTTLING FOR INDIVIDUAL VIRTUAL SERVICES SUPPORTED ON A NETWORK SERVER

This is a continuation-in-part of application No. 08/674,684, filed Jul. 2, 1996, entitled "Adaptive Bandwidth Throttling for Network Services", now U.S. Pat. No. 5,799,002.

TECHNICAL FIELD

This invention relates to host network servers for computer network systems. More particularly, this invention relates to a bandwidth management system that throttles bandwidth demands imposed by clients on the network systems when requesting various services from the network servers.

BACKGROUND

A computer network system has one or more host network servers connected to serve data to one or more client computers over a network. FIG. 1 shows a simple computer network system 20 with a single host network server 22 11 connected to multiple clients 24(1), 24(2), . . . , 24(N) via a network 26. The clients 24(1)–24(N) send requests for data and/or services to the server 22 over the network 26. For discussion purposes, suppose the server 22 is configured as an Internet service provider, or "ISP". The ISP server 22 provides an email service 28 that handles electronic mail messages over the Internet 26 and a web service 30 that supports a web site accessible by the clients.

The network 26 is a medium with a predefined bandwidth capacity that is shared among the clients 24(1)–24(N). The network 26 is represented in FIG. 1 as a network pipeline to indicate a finite bandwidth capacity. The network 26 is representative of different network technologies (e.g., Ethernet, satellite, modem-based, etc.) and different configurations, including a LAN (local area network), a WAN (wide area network), and the Internet. The bandwidth capacity depends on the technology and configuration employed. For this example, suppose the network 26 has a total bandwidth capacity of 1,000 kilobits per second (Kb/s). Given this fixed bandwidth, the ISP administrator can allocate portions of the bandwidth for the various services 28 and 30. For instance, the ISP administrator might allocate 400 Kb/s to the email service 28 and 600 Kb/s to the web service 30.

As the clients 24(1)–24(N) access the services 28 and 30, they consume bandwidth on the network 26. The responses from the host server 22 also consumer bandwidth. When the allocated bandwidth for a service becomes saturated with client requests and server responses (such as the web service when bandwidth consumption reaches 600 Kb/s), some of the requests are either delayed in transmission or not delivered to the intended destination.

To alleviate the problem of bandwidth saturation, network systems are often implemented with some form of request throttling that works to minimize network congestion and efficiently utilize the allocated bandwidth. The problem, however, becomes slightly more complicated in the case of multiple network servers on the same host system. Some network servers might disproportionately allocate bandwidth for their own tasks at the expense of excluding other concurrently running network servers from performing their requested operations. In this case, any bandwidth throttling mechanism must be effected among all of the network servers on the host computer network system.

One approach to a global bandwidth throttling system is described in a co-pending application Ser. No. 08/674,684, entitled "Adaptive Bandwidth Throttling for Network Services", filed Jul. 2, 1996, in the name of Murali R. Krishnan. This application is assigned to Microsoft Corporation. The adaptive bandwidth throttling system operates on the computer network system to allocate bandwidth to the network servers as a function of thresholds defined by the administrator. The bandwidth throttling system implements a series of successively significant bandwidth throttling actions in response to increasing bandwidth consumption, with the effect to minimize congestion and improve efficiency.

The bandwidth throttling system measures bandwidth usage and compares the measured usage against administrator defined thresholds. In one implementation, for example, the administrator uses thresholds to define three usage zones. When the bandwidth usage is low (i.e., the first zone), all services are permitted. No throttling action is taken. As request traffic increases, the measured bandwidth usage rises to exceed a first threshold (i.e., the second zone). When this occurs, the bandwidth throttling system initiates a throttling action in the form of delaying a class of requests for the network server.

If the demand for bandwidth further increases and the measured usage exceeds a second threshold (i.e., the third zone), the bandwidth throttling system escalates to a more severe throttling response. As an example, the bandwidth throttling system blocks the one class of requests from execution and concurrently delays another class of requests, which were previously not impacted in the initial throttling action taken in zone two.

As a result of the hierarchical response to increasing network traffic, the administrator can customize the bandwidth throttling to specific request classes. Those classes deemed by the administrator to be low priority could be blocked or rejected in favor of allowing higher priority classes to execute. Thus, the adaptive bandwidth throttling system incrementally reduces demand for network bandwidth without disrupting the provision of desired network services.

The bandwidth throttling system described in the co-pending application applies to the total bandwidth used by all services on all servers connected to the network, and is based on a single set of thresholds specified by the administrator. However, current server technology allows for administrators to run multiple "virtual" services all running on a single machine and service.

FIG. 2 shows an example in which the ISP 22 supports multiple domains 32(1)–32(M) on the same web service 30. For instance, it is not uncommon for an ISP to support thousands of domains on the same web service. To the client, however, each domain functions as its own service as if running on its own HTTP (Hypertext Transfer Protocol) server on its own machine. Hence, the ISP 22 is effectively running multiple "virtual services" on multiple "virtual" HTTP servers, all from the same web service on the same machine. In such cases, network bandwidth control cannot be limited to applying globally to all the virtual servers. The all-or-nothing approach is unacceptable because the administrator often desires to designate some virtual services as more or less critical than others. For this reason, finer bandwidth control is required. Bandwidth throttling must be controllable at the virtual service level as well.

Accordingly, the inventors have developed a bandwidth throttling system that effectively controls bandwidth on a per virtual service basis. The bandwidth throttling system thus improves upon the system and technology described in the above noted patent application.

SUMMARY

This invention pertains to a bandwidth throttling system that controls bandwidth on a per virtual service basis. The bandwidth throttling system determines the amount of bandwidth used by each virtual service and selectively throttles requests for a particular virtual service independently of others based upon the bandwidth usage for the particular virtual service.

According to an aspect of the invention, the bandwidth throttling system maintains a bandwidth throttling (BT) object for each of the virtual services. The BT object tracks the bandwidth being presently used by its associated virtual service and maintains the bandwidth threshold set by the administrator to trigger throttling actions for that virtual service. When a request for a virtual service is received at the server, the bandwidth throttling system uses the data kept in the BT object to determine whether to allow, delay, or reject the request for that virtual service.

In one implementation, the bandwidth throttling system utilizes an adaptive, hierarchical throttling strategy that is applied to each virtual service independently. The bandwidth throttling system compares the bandwidth usage for the virtual service against the administrator-defined thresholds (both of which are obtained from the BT object). If the presently used bandwidth exceeds a first threshold, a first set of throttling actions is applied. If the presently used bandwidth exceeds a second threshold greater than the first threshold, a different second set of throttling actions is applied. In this manner, the administrator is given maximum control at setting throttling policies for each individual virtual service independently of other virtual services.

The bandwidth throttling system periodically updates the measured bandwidth parameter in the BT objects. The bandwidth throttling system computes an average bandwidth usage based on the number of bytes transferred to or from the virtual service over a preset time period. To reduce the amount of computational overhead associated with updating the measured bandwidth for each virtual service, the bandwidth throttling system maintains two lists: a born list that contains the set of pointers to all BT objects and an active list that contains a subset of pointers to only those objects that are currently active. During the periodic update, the bandwidth throttling system only updates the bandwidth measurements for the BT objects on the active list, as the measurements for the inactive BT objects do not change.

DETAILED DESCRIPTION

Figure 1:
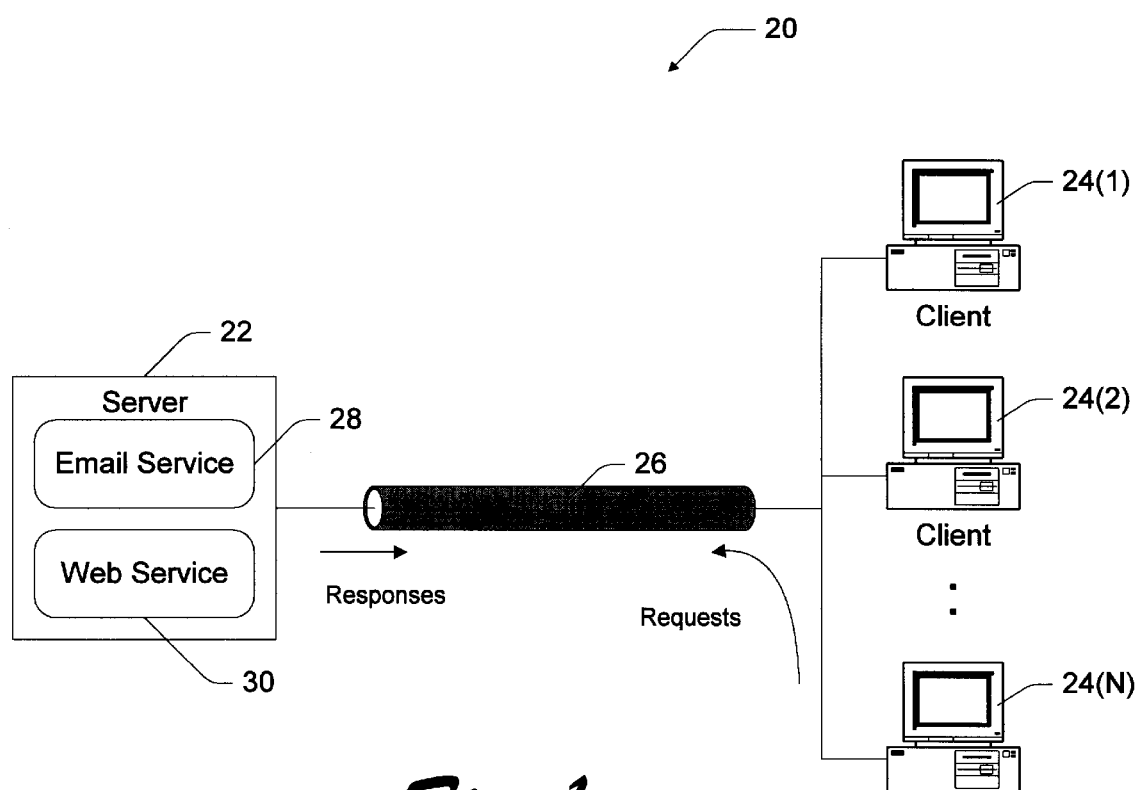
FIG. 1 is a diagrammatic illustration of a host computer network system, which is used to illustrate the present state of the art.
Figure 2:
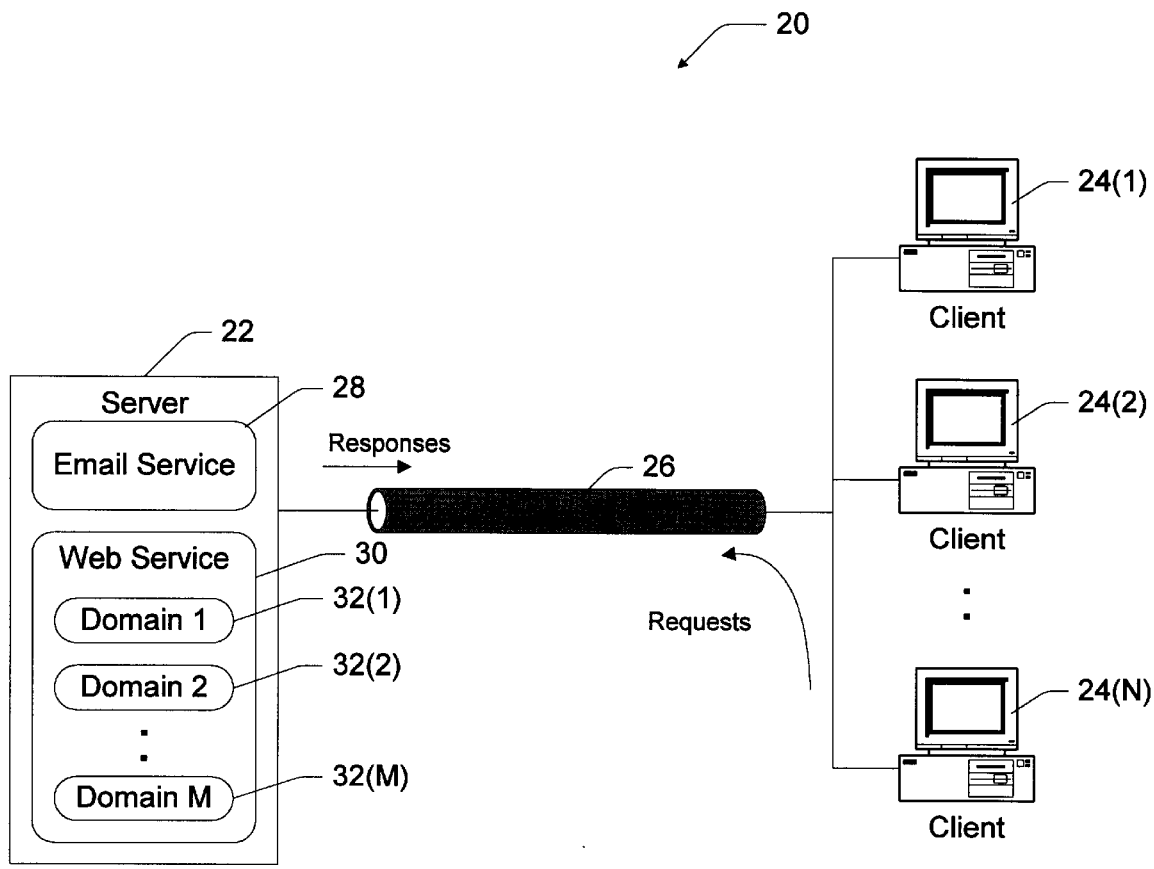
FIG. 2 is a diagrammatic illustration of the host computer network system implemented with multiple "virtual servers" supported by a single service on a single server machine.
Figure 3:
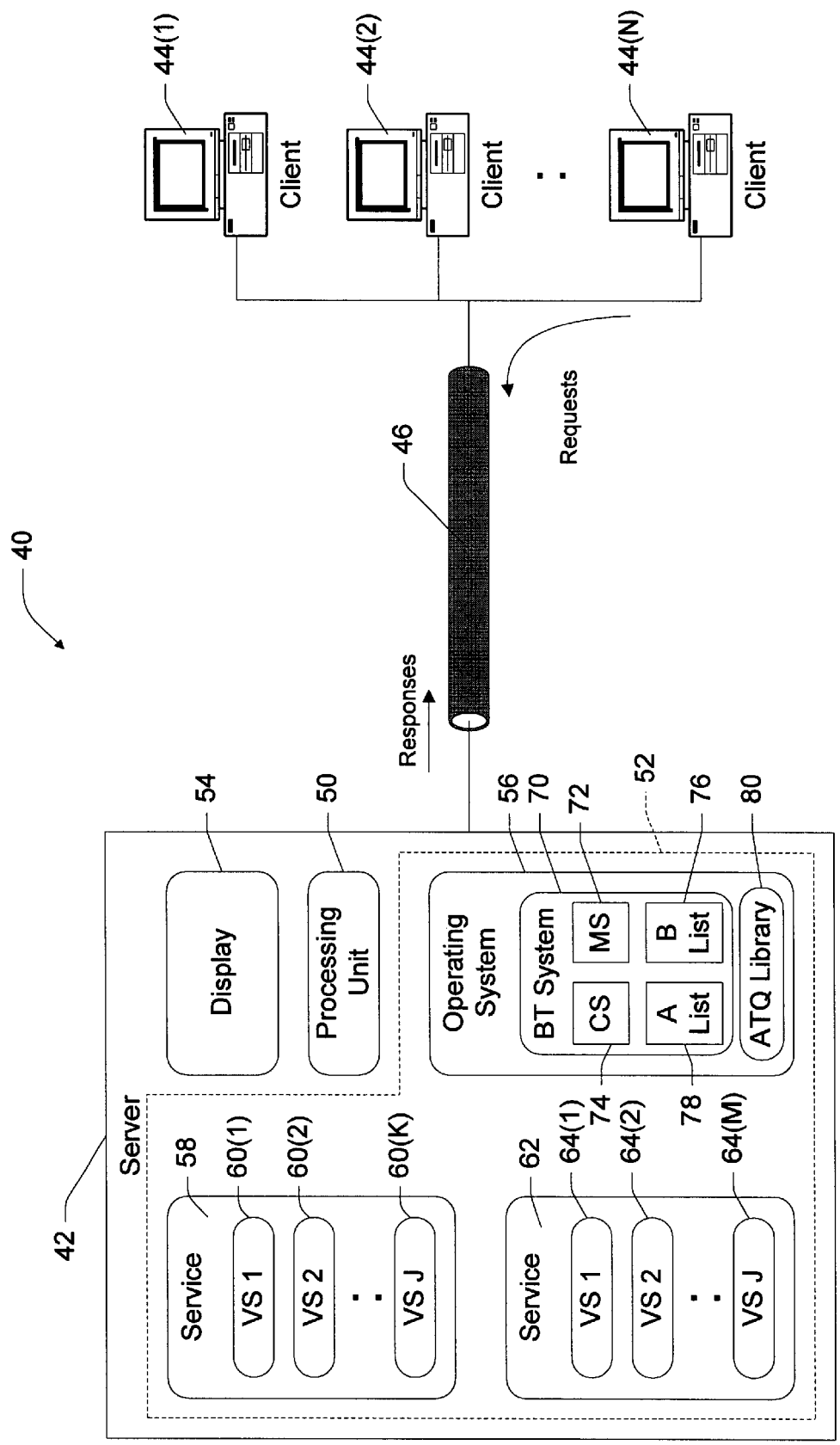
FIG. 3 is a diagrammatic illustration of a host computer network system having a server implemented with a bandwidth throttling system of this invention.

FIG. 3 shows the computer network system 40 having a host network server 42 connected to serve multiple clients 44(1), 44(2), . . . , 44(N) over a network 46. The network 46 is representative of many diverse network technologies (e.g., Ethernet, satellite, modem-based, etc.) and different configurations, including a LAN (local area network), a WAN (wide area network), and the Internet. For discussion purposes, the computer network system 40 is described in the context of the Internet whereby the network server 42 is an Internet Service Provider (ISP) that provides services to the clients 44(1)–44(N) over the Internet 46. It is noted, however, that this invention may be implemented in other networking contexts, including LAN and WAN configurations.

The ISP network server 42 is connected to the Internet 46 via a data transmission network connection that has a predetermined fixed bandwidth capacity. The bandwidth is typically characterized in terms of kilobits per second or "Kb/s". The clients 44(1)–44(N) share the bandwidth when accessing the services provided by the ISP server 42.

The network server 42 has a processing unit 50, a memory subsystem 52, and a display 54. The memory subsystem 52 includes both volatile memory (e.g., RAM) and non-volatile memory (e.g., ROM, hard disk drive, floppy disk drive, CD-ROM, etc.). The network server 42 runs a network server operating system 56. In the preferred implementation, the operating system 56 is the Windows NT server operating system from Microsoft Corporation, which is modified to incorporate the bandwidth throttling system described below. As one example implementation, the network server 42 is a microprocessor-based personal computer configured with the Windows NT server operating system. It is noted, however, that other server configurations (e.g., workstation, minicomputer, etc.) and other operating systems (e.g., a UNIX-based operating system) can be used to implement aspects of this invention.

The server 42 supports one or more services, as represented by services 58 and 62. Two example services are an email service and a web service. Each service 58 and 62 presents itself to the clients as multiple "virtual services", as represented by virtual services (VS) 60(1)–60(J) for service 58 and virtual services 64(1)–64(K) for service 62. Within the context of a web service, the virtual services correspond to different domains supported on the same web service. To the client, each domain appears as its own web service running on its own HTTP (Hypertext Transfer Protocol) server. In reality, the domain is simply one of many supported by the single web service on the same server. Hence, the server 42 is said to support multiple "virtual services" or present multiple "virtual servers" using the same web service on the same machine.

Since the clients 44(1)–44(N) share the bandwidth capacity for the virtual services offered by the server 42, there can be congestion at times whereby too many simultaneous client requests bombard the server 42. To minimize congestion and promote efficiency, the server 42 employs a bandwidth throttling (BT) system 70 that throttles requests in an effort to avoid bandwidth saturation. The bandwidth throttling system 70 is shown implemented as a software module incorporated into the operating system 56 as part of, for example, the Internet Information Services (IIS) component in the operating system. Alternatively, the BT system may reside as a separate component independent of the operating system. It is further noted that the BT system 70 can be implemented separately from the server 42 to manage request traffic to the services supported on server 42, as well as services supported on other servers (not shown).

The BT system 70 provides a global throttling approach that applies across all of the services 58 and 62 supported by the server 42. The global throttling technique imposes successively significant bandwidth throttling actions in response to increasing bandwidth consumption. This global throttling technique is described in a co-pending application Ser. No. 08/674,684, entitled "Adaptive Bandwidth Throttling for Network Services", which was filed Jul. 2, 1996, in the name of Murali R. Krishnan. This application is assigned to Microsoft Corporation and is incorporated herein by reference. For global throttling, the administrator defines one or more global bandwidth thresholds that must be surpassed to initiate some form of bandwidth throttling that applies to all incoming requests.

This invention concerns an improvement of the global bandwidth throttling system described in the above application. In addition to global throttling, the BT system 70 enables a finer grain control of the bandwidth on a per virtual service basis. That is, rather than applying global throttling control across all of the services, the BT system 70 also permits throttling control at the virtual service level. This empowers an ISP administrator to set and monitor different bandwidth thresholds for individual virtual services, and to manage the flow of requests to each virtual service independently of other virtual services.

The BT system 70 has a measuring subsystem 72 to measure the portion or amount of fixed bandwidth that is being presently used by each of the virtual services. In a preferred implementation, the control subsystem 72 tracks the bandwidth utilization on a per virtual service basis using multiple bandwidth throttling objects that are created to represent the virtual services. The bandwidth throttling objects are described in more detail below with reference to FIG. 5.

The BT system 70 has a control subsystem 74 to facilitate a throttling strategy that selectively throttles requests for the individual virtual services independently of one another on a per virtual service basis. The control subsystem 74 applies throttling actions to individual virtual services depending upon the level of bandwidth being consumed by that virtual service.

More particularly, the control subsystem 74 applies a first set of throttling actions to requests for a particular virtual service, say virtual service 60(1), if the presently used bandwidth measured for the particular virtual service 60(1) exceeds a first threshold. These throttling actions may include allowing certain types of requests (e.g., high priority requests) while delaying other types of requests (e.g., low priority requests), as prescribed by the administrator. The throttling actions imposed on virtual service 60(1) are independent of any throttling actions that may be imposed on other virtual services 60(2)–60(J) and 64(1)–64(K) so that only requests bound for the virtual service 60(1) are affected by the actions.

If the I/O activity for the virtual service 60(1) continues to rise and the bandwidth used by the virtual service 60(1) exceeds a second threshold, the control subsystem 74 applies a second, more restrictive set of throttling actions to the requests for that virtual service. In this case, the throttling actions may include allowing only requests designated by the administrator as high priority, delaying requests designated as medium priority, and rejecting requests designated as low priority.

The BT system 70 has a born or "B" list 76 and an active or "A" list 78 to help manage the bandwidth throttling objects. In general, the BT objects are created for each virtual service. A pointer to a BT object is placed on the born list 76 when the BT object is created. When the virtual service is handling client requests, the associated BT object is also placed on the active list 78 to indicate that the virtual service is presently receiving or responding to requests. The active list is thus a subset of the born list.

The purpose of keeping an active list is to prevent unnecessary bandwidth calculations for BT objects that are not active. For an ISP that supports thousands of domains, for example, it is anticipated that only a fraction of the domains (e.g., ten percent) will be active at any one time. The BT objects for frequently visited web sites, such as ESPN® Sports Zone or MSNBC, might always be active, whereas BT objects associated with rarely visited web sites are seldom active. Only the BT objects on the active list are routinely updated as to their presently used bandwidth. The BT objects on the born list, but not on the active list, are passed over as the bandwidth calculations are unnecessary for these objects.

In the example implementation, the BT system 70 utilizes a asynchronous thread queue (ATQ) support library 80 provided by the Windows NT operating system to handle requests. The ATQ library 80 enables asynchronous input and output operations.

Figure 4:
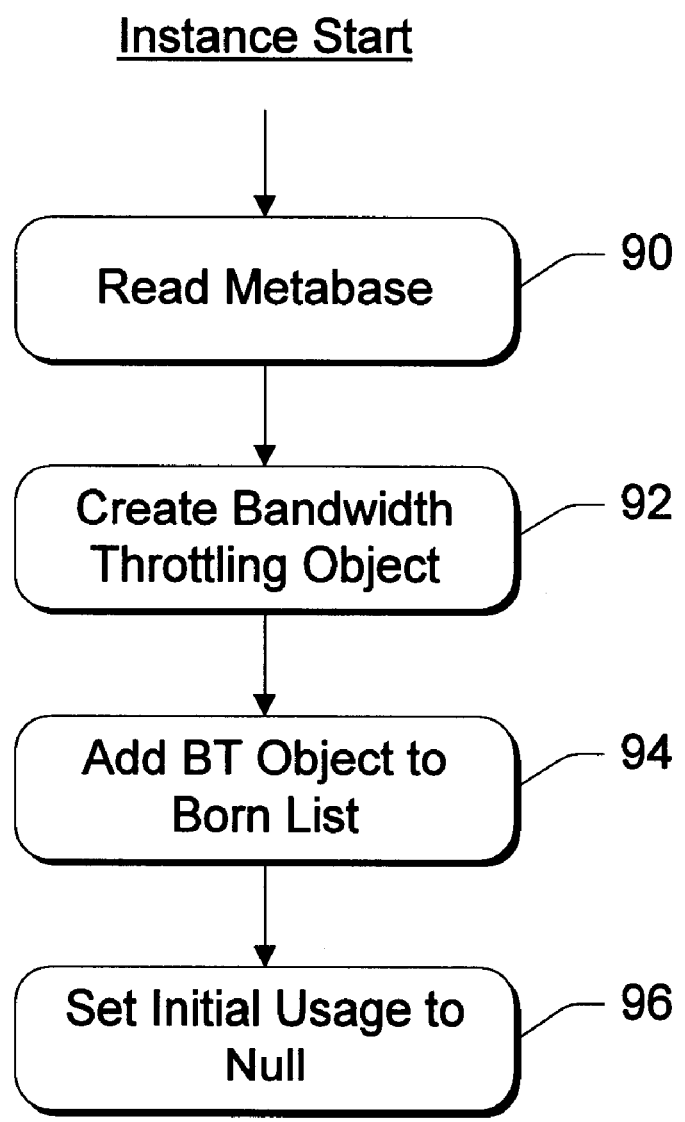
FIG. 4 is a flow diagram showing steps in a method for initializing the bandwidth throttling system.

FIG. 4 shows steps for initializing the BT system 70 in preparation for handling client requests. This start sequence occurs when the operating system and Internet Information Service (IIS) component is booted. At step 90, the IIS reads a metabase maintained on non-volatile memory to obtain content data used to construct the bandwidth throttling objects. The metabase contains data on any virtual service that has previously registered with the operating system. The metabase data includes the names of the virtual services, the bandwidth thresholds for the virtual services, and the like.

With this information, the control subsystem 74 creates a BT object for each virtual service (step 92 in FIG. 4). The BT object is stored at the server and used to track the bandwidth performance of the associated virtual service. The control subsystem 74 adds the BT object to the born list 76 (step 94 in FIG. 4). The initial bandwidth measurement for the BT object is then set to null as no I/O activity has yet taken place (step 96 in FIG. 4).

Figure 5:
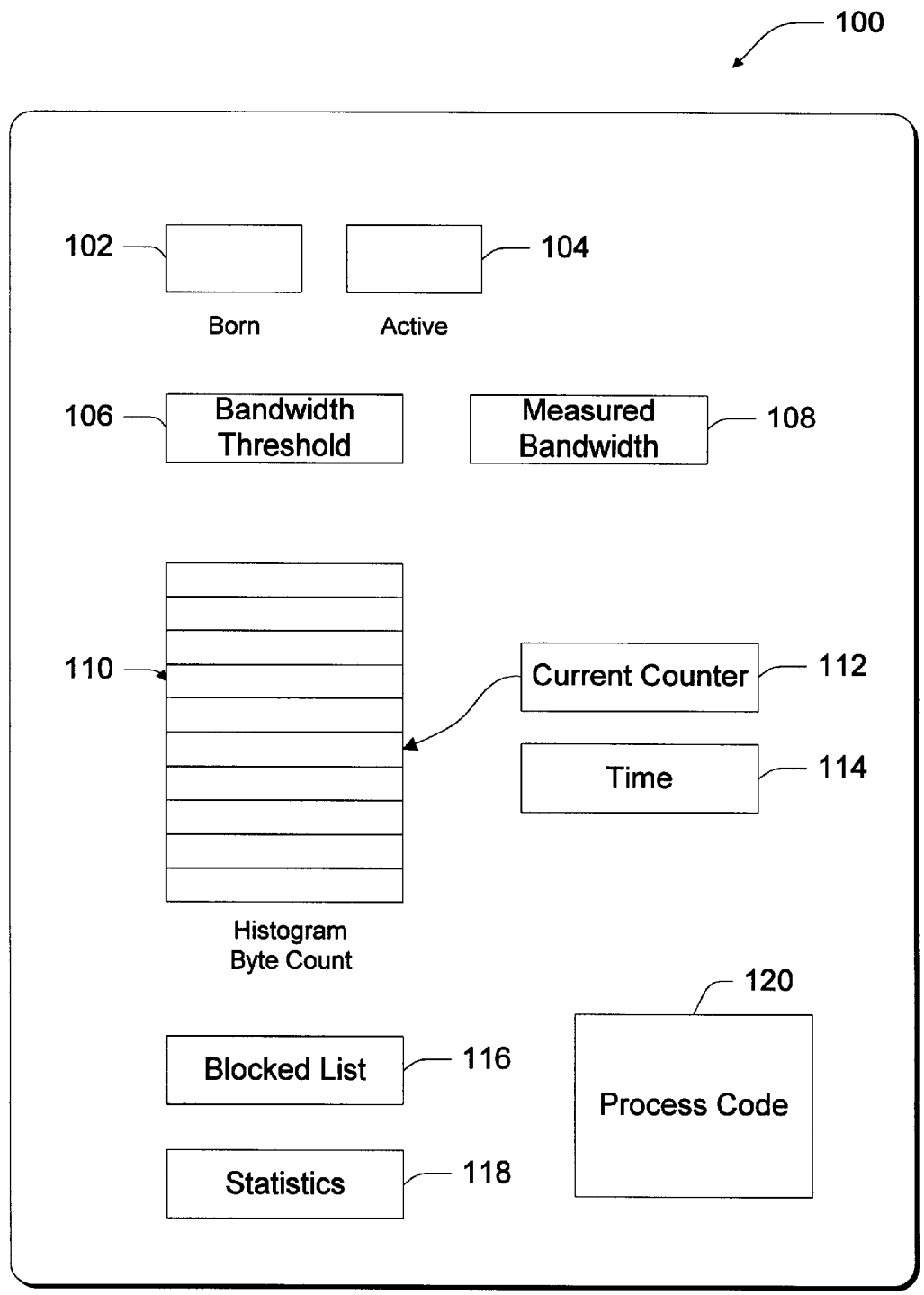
FIG. 5 is a diagrammatic illustration of a bandwidth throttling object that is stored at the server and utilized by the bandwidth throttling system to track bandwidth performance of individual virtual services.

FIG. 5 shows a bandwidth throttling object 100 in more detail. The BT object 100 has born and active fields 102 and 104 that facilitate placement of pointers to the BT object 100 onto the born and active lists 76 and 78. The BT object 100 further has a threshold data field 106 to hold a bandwidth threshold specified by the administrator for the associated virtual service. The bandwidth threshold 106 indicates a level of I/O activity for an associated virtual service that is effective to trigger throttling actions on requests for the associated virtual service. The thresholds are set by the administrator in a manner to avoid real or potential congestion that may occur if no throttling action is taken.

The BT object 100 has a measured bandwidth data field 108 to hold a measured bandwidth that is presently being used by the associated virtual service to accommodate the I/O activity. The measuring subsystem 72 routinely measures the bandwidth used by the virtual service and stores this value in the measured bandwidth data field 108. One specific technique for determining the presently consumed bandwidth is described below with reference to FIGS. 8 and 9. This technique involves statistical analysis using a histogram of I/O activity. More to particularly, the measuring subsystem counts the number of bytes passed to or from the virtual service during fixed time intervals. To support this measurement technique, the BT object 100 includes a histogram data field 110 to hold data indicative of the I/O activity for the virtual service measured at fixed time intervals. A counter 112 maintains a pointer to a memory cell in which the I/O count for the current interval of the histogram is to be stored. A time field 114 keeps a time value that is used in calculating an average bandwidth consumption over the multiple histogram intervals.

The BT object 100 further includes a blocked list data field 116 to hold a collection of requests for the virtual service that have been temporarily delayed as a result of a throttling action. The BT object 100 also keeps statistics 118 relevant to the bandwidth maintenance. These statistics might include information such as the I/O activity, when or how often thresholds are exceeded, when and what throttling actions are imposed on the virtual service (i.e., how many requests for the virtual service are being allowed, blocked, or rejected), and so forth. The statistics 118 can be presented to the administrator on demand, and displayed in a user interface on the display 54 to assist the administrator in analyzing performance of individual virtual services.

The BT object 100 contains process code 120 for performing methods used in the control and throttling of bandwidth. Table 1 shows an example set of methods that might be contained in the BT object 100.

TABLE 1

| Method | Description |
|---|---|
| SetThreshold | Set the bandwidth threshold for this object. When measured bandwidth exceeds this value, the control system 74 will take appropriate throttling action. |
| GetThreshold | Query the currently set bandwidth threshold. |
| UpdateBytesXfered | Called when bytes have been transferred and the transfer pertains to this bandwidth throttling object. |
| GetStatistics | Query bandwidth maintenance statistics. |
| UpdateBandwidth | Update the internally maintained bandwidth measurement for this object. |

Establishing individual BT objects 100 for each virtual service is advantageous because the administrator can set bandwidth thresholds for on a per virtual service basis. Thus, some virtual services might be allocated more bandwidth, or a higher priority of usage, that other virtual services. For example, suppose the ISP server supports three virtual services. Two of the virtual services pay the same amount for a basic web site, while the third virtual service pays a premium for a premier web site. The administrator might wish to set the threshold(s) for the premier virtual service at a higher level than the basic virtual service. In this manner, throttling actions will be activated first for the basic virtual services to control request traffic before any throttling action is initiated for the premier virtual service, thereby allowing the I/O activity to continue on the premier virtual service unimpeded.

Figure 6:
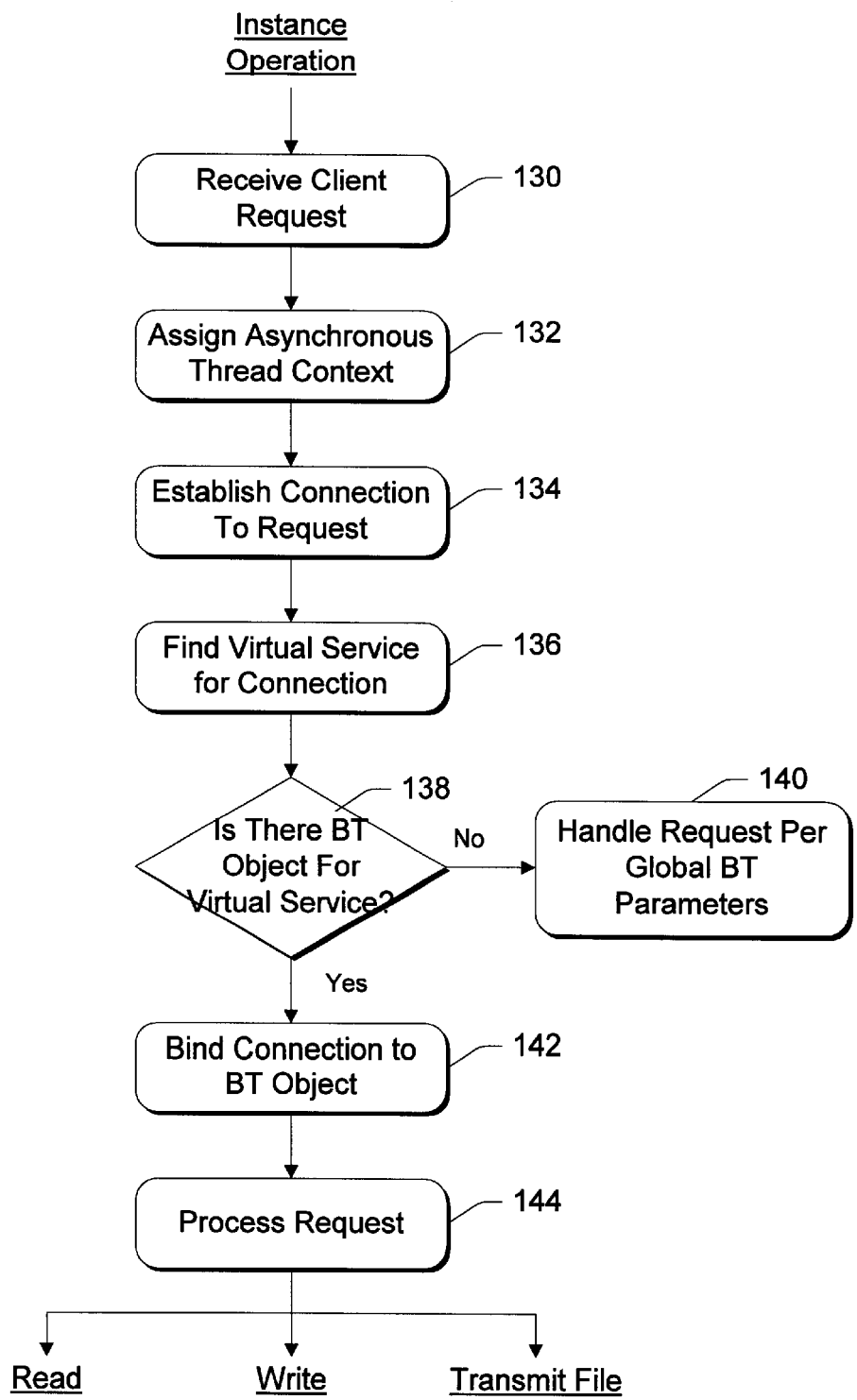
FIG. 6 is a flow diagram showing steps in a method for handling client requests at the ISP server.

FIG. 6 shows steps for handling client requests at the ISP server 42. At step 130, the ISP server 42 receives from a client a request for a virtual service supported by the server. In the context of a web site, the request might be in the form of a universal resource locator (URL), such as "http://www.microsoft.com/". The ISP server 42 assigns an asynchronous thread Context (ATQ Context) from the ATQ library 80 to handle the incoming request (step 132 in FIG. 6). The ATQ Context interconnects the BT system with the appropriate virtual service. The ATQ library also supports the I/O operations with respect to the network by providing functions to read, write, and transmit data files over the network connection using socket capability available at the server (necessary network access data including socket are stored in the ATQ Context).

Part of the setup of the ATQ context is to establish a connection (step 134). This entails specifying a connection callback that the ATQ library will call when a request arrives. The ATQ passes completion information, status information, and a special context value to the callback. All subsequent asynchronous I/O operations between the client and ISP utilize the special context value to allow the ATQ library to operate properly and independently of other ATQ contexts that may be active.

The ISP server 42 parses the client request to identify the virtual service sought by the request (step 136 in FIG. 6). The BT system 70 next determines whether a BT object 100 exists for the virtual service (step 138). For this determination, the BT system 70 checks the born list 76 to see if any BT object has been created for the requested virtual service. If a BT object does not exist (i.e., the "no" branch from decision step 138), the BT system 70 handles requests for the virtual service using the global bandwidth throttling parameters (step 140). Conversely, if a BT object exists for the virtual service (i.e., the "yes" branch from decision step 138), the BT system 70 binds the client connection with the BT object (step 142 in FIG. 6). The BT object remains bound to the client connection until the client is finished with its requests.

For purpose of continuing discussion, assume that a BT object is located and bound to the connection. Next, the ISP server processes the request (step 144 in FIG. 6). The request is characterized as one of three types: read, write, and transmit file. A read request is one in which the server is waiting to read data from the client (or the server seeks data from the client). A write request seeks to write data from the server to the client. A transmit file request asks the ISP to download a document or file, such as occurs usually during an initial HTTP GET operation.

Figure 7:
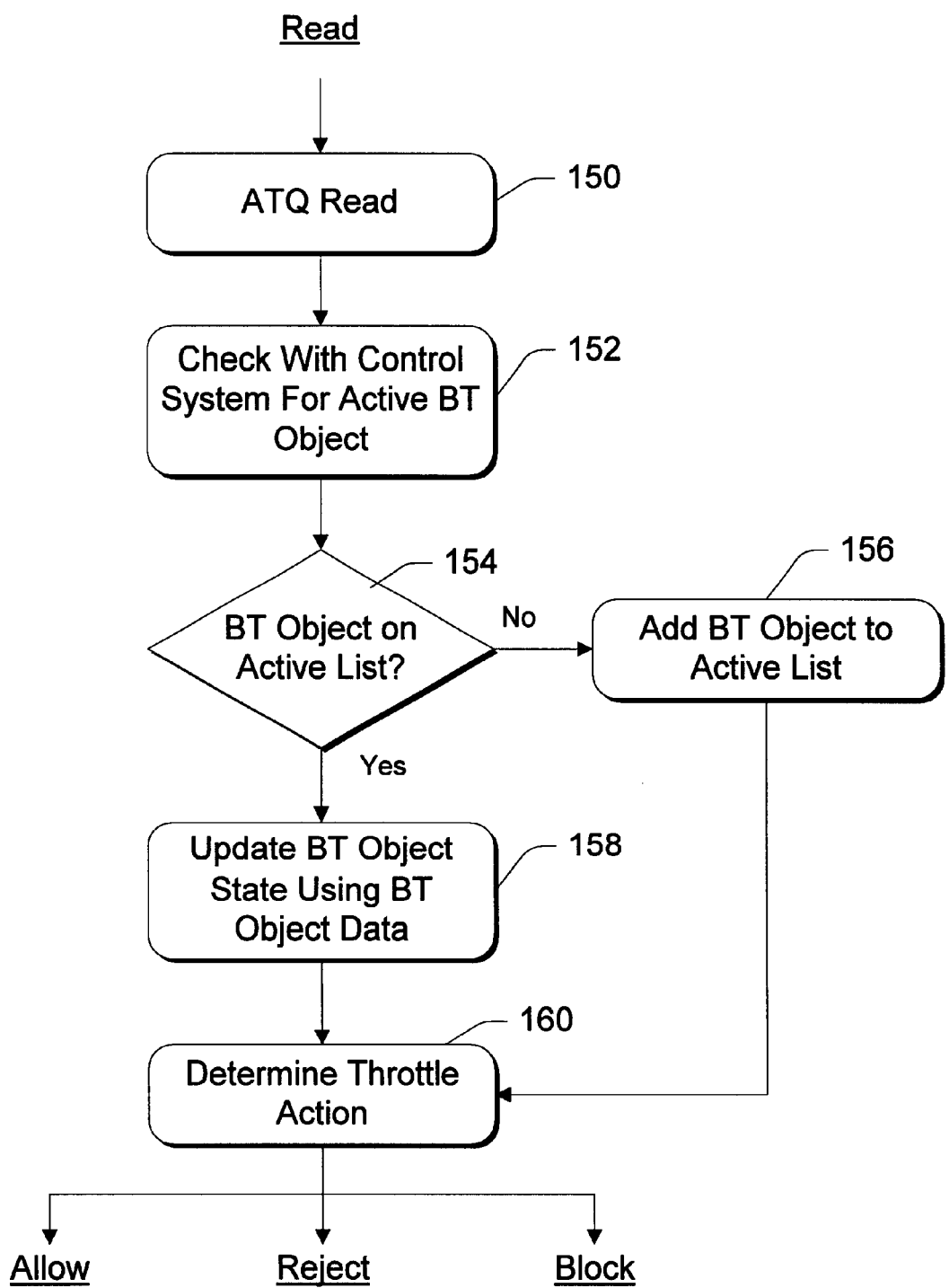
FIG. 7 is a flow diagram showing steps in a method for processing a read operation directed to a virtual service.

FIG. 7 shows steps for processing a read request. It is noted that similar steps are taken for a write request and a transmit file request. The ATQ uses the context value and invokes the operating system to perform a read operation (step 150 in FIG. 7). The service sets up a callback function in the ATQ Context to be called when the operation completes. The ATQ checks with the control subsystem 74 to determine whether the BT object associated with the requested virtual service is on the active list 78 (steps 152 and 154). If not (i.e., the "no" branch from step 154), the control subsystem 74 adds the BT object 100 to the active list (step 156 in FIG. 7). On the other hand, if the BT object 100 is on the active list 78 (i.e., the "yes" branch from step 154), the control subsystem 74 updates the BT object state (step 158 in FIG. 7).

At step 160, the control subsystem evaluates a current set of throttling actions to determine whether the read operation for the requested virtual service can be performed. The evaluation is based on the present I/O activity for the virtual service as maintained in the BT object for that virtual service. More specifically, the control subsystem 74 extracts the measured bandwidth 108 and the bandwidth threshold 106 from the BT object 100 and compares the two values. Different throttling actions are taken depending upon the comparison results.

The BT system 70 preferably employs an adaptive, hierarchical throttling strategy. In one preferred technique, the administrator establishes threshold zones based on the threshold T and an offset value δ above and below the threshold T (i.e., T±δ). The result is a three-zone control area subdivided by two thresholds (i.e., T−δ and T+δ).

Figure 8:
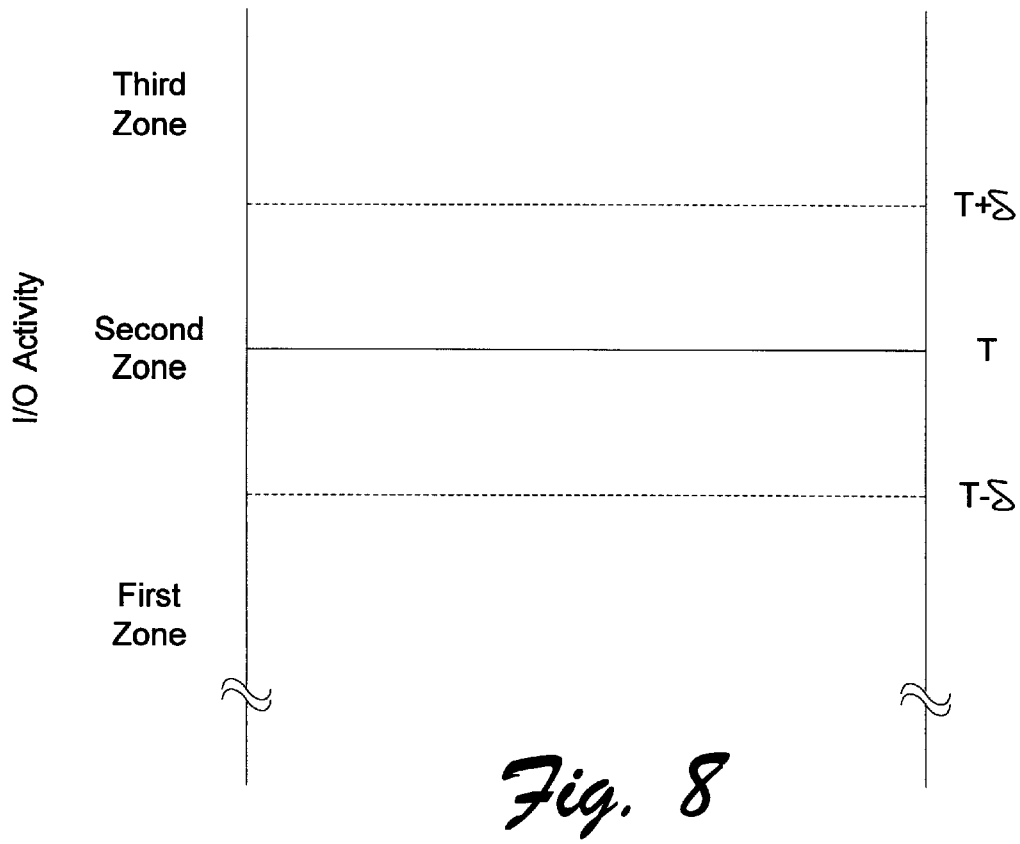
FIG. 8 is a diagrammatic illustration of a throttling strategy which uses a threshold and offset value to establish a tiered approach to invoking various sets of throttling actions depending upon the I/O activity.

FIG. 8 illustrates the tiered control strategy. The vertical axis represents bandwidth usage, measured in terms of I/O activity as the number of bytes being passed to or from a virtual object within a predefined timeframe. If the bandwidth being used by the virtual service is less than the first threshold (i.e., the first zone), no throttling actions are taken. If the bandwidth usage exceeds the first threshold but is less than the second threshold (i.e., the second zone), a first set of throttling actions is taken. If the bandwidth usage exceeds a second threshold higher than the first threshold (i.e., the third zone), a second set of throttling actions is taken.

The different sets of throttling actions affect operations differently depending upon a plan devised by the administrator. In setting the actions, the administrator takes into account the nature of the operation, the dynamic behavior of the network server, the amount of processor and memory resources consumed by and required by the requested operation, and the estimated and specified bandwidths. As one example, suppose the control subsystem characterizes all operations as either read (R), write (W), or transmit (T). In addition, the control subsystem provides two subclasses large (L) and small (S) to denote the size of the data involved in handling the three operations. Accordingly, the possible operations are read (R), write-small (WS), write-large (WL), transmit-small (TS), and transmit-large (TL).

In this example, there are three possible actions: allowing a request to proceed, rejecting the request, and blocking (i.e., delaying) the request until a later time. Table 2 shows a hierarchical, adaptive throttling strategy for this example.

TABLE 2

| Measured v. Threshold | Action |
| --- | --- |
| M < T−δ (First Zone) | Allow: R, WS, WL, TS, TL<br>Delay: None<br>Reject: None |
| T−δ ≦ M ≦ T+δ (Second Zone) | Allow: WS, WL, TS, TL<br>Delay: R<br>Reject: None |
| M > T+δ (Third Zone) | Allow: WS, TS<br>Delay: WL, TL<br>Reject: R |

An electronic version of table 2 can be stored in the BT system 70 for use in determining a set of throttling actions to apply to incoming requests.

With reference again to FIG. 7, suppose the control subsystem 74 finds that the measured bandwidth utilized by the virtual service (as indicated by the measure bandwidth parameter 108 in BT object 100) exceeds the first threshold but not the second. The control subsystem 74 looks up in table 2 what throttling action (if any) is to be applied to a read operation for a virtual service whose bandwidth exceeds the first threshold. In this case, the control subsystem 74 obtains from the table a throttling action in the form of a delay request. The control subsystem 74 informs the ATQ that the read operation is to be delayed temporarily until bandwidth usage for the requested virtual service decreases.

It is noted that the above table of throttling actions is universal and can be used by the control subsystem 74 for determining the fate of requests destined for any of the virtual services. However, the bandwidth thresholds and measured bandwidth parameters utilized by the control subsystem 74 during the table look-up are specific to the virtual services themselves and locally maintained in the BT objects associated with the virtual services.

After the I/O for the read operation completes, the ATQ callback is called. This callback is passed the completion status, which includes the number of bytes transferred in the operation and the error codes, if any errors occurred. This information is recorded in the BT object and the state of the BT object is updated.

Figure 9:
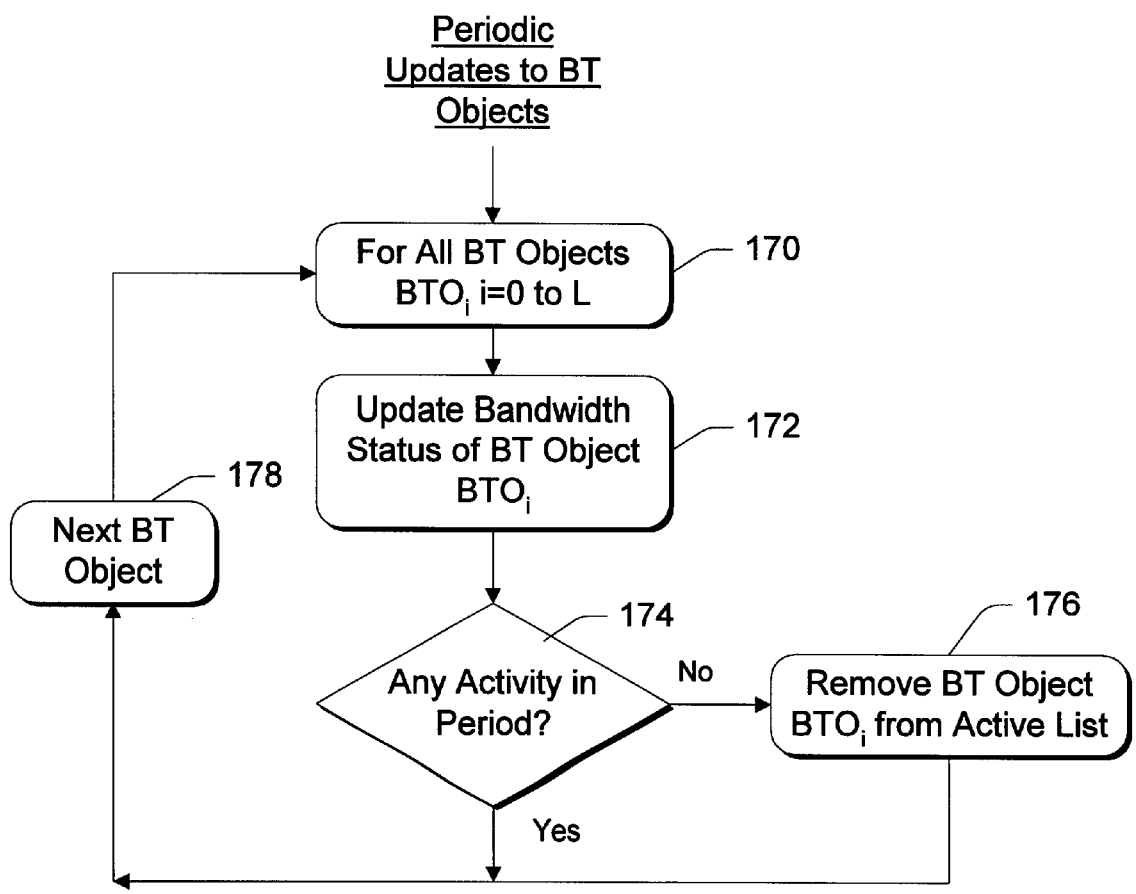
FIG. 9 is a flow diagram showing steps in a method for updating bandwidth measurements in individual BT objects.

FIG. 9 shows steps that are routinely performed to update the measured bandwidth parameter in all active BT objects. For each BT object on the active list 78 (step 170 in FIG. 9), the measuring subsystem 72 updates the measured bandwidth 108 (step 172). By considering only the BT objects on the active list, the BT system 70 reduces the amount of administrative computation time used to update the bandwidth values.

Figure 10:
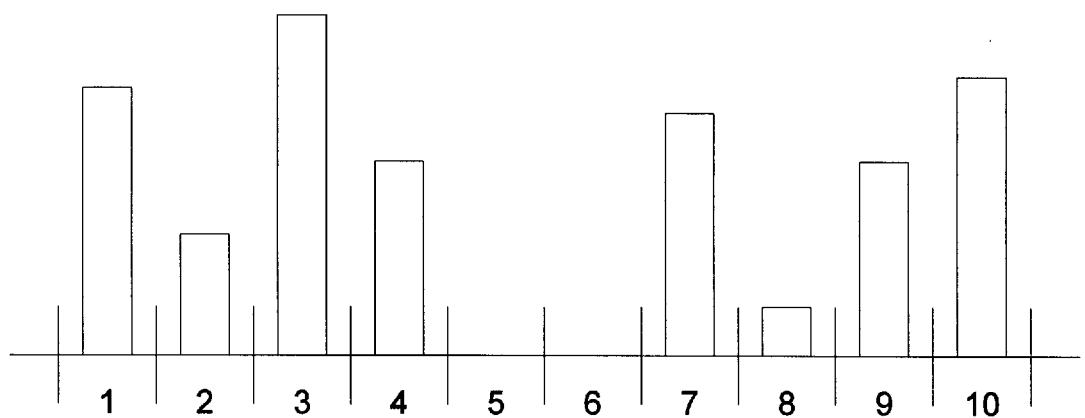
FIG. 10 is a diagrammatic illustration of a histogram stored in a BT object to keep statistics on I/O activity for the virtual service.

One specific technique for computing the bandwidth being consumed by the virtual service is to utilize a histogram. FIG. 10 shows a histogram having ten intervals 1–10 of fixed duration (e.g., one second each). Within each interval, the BT object tracks the I/O activity for the virtual service in terms of the total number of bytes. Byte information pertaining to each operation occurring within an interval is passed to the BT object during the ATQ callback. Depending on the I/O activity, different byte counts are likely to occur in the various intervals, as represented in FIG. 10.

The byte counts are kept for each interval in the histogram data field 110 of BT object (FIG. 5). The data field has ten cells to maintain the counts of the ten intervals. This data filed is implemented using a circular memory that permits a continuous cycle of the ten memory cells. A current counter 112 indicates which memory cell is presently being filled with byte count data. The BT object 100 also tracks the time consumed for the I/O activity to transfer the bytes to or from the virtual service. The time parameter is kept in data field 114 of the BT object 100 (FIG. 5).

To compute a measured bandwidth, the measuring subsystem 72 totals the byte counts contained in the histogram data field 110 and divides that result by the total time kept in field 114. This calculation yields an average bandwidth usage over the ten-interval time fame. The average bandwidth is then placed in the data field 108 for future use in determining throttling actions for the specific virtual service associated with the BT object.

With continuing reference to FIG. 9, the update process may discover that the virtual service has not recently received any I/O requests. At step 174, the measuring subsystem 72 determines whether any activity has occurred during a past period of preset duration (e.g., the time necessary to cycle through the histogram or longer). If there is activity (i.e., the "yes" branch from step 174), the BT object remains active and flow continues to the next BT object on the active list (step 178). On the other hand, if no activity has occurred (i.e., the "no" branch from step 174), the control subsystem 74 removes that BT object from the active list 78 (step 176 in FIG. 9). The BT object remains on the born list 76, but is no longer carried on the active list 78. Flow then continues to the next BT object on the active list (step 178).

Figure 11:
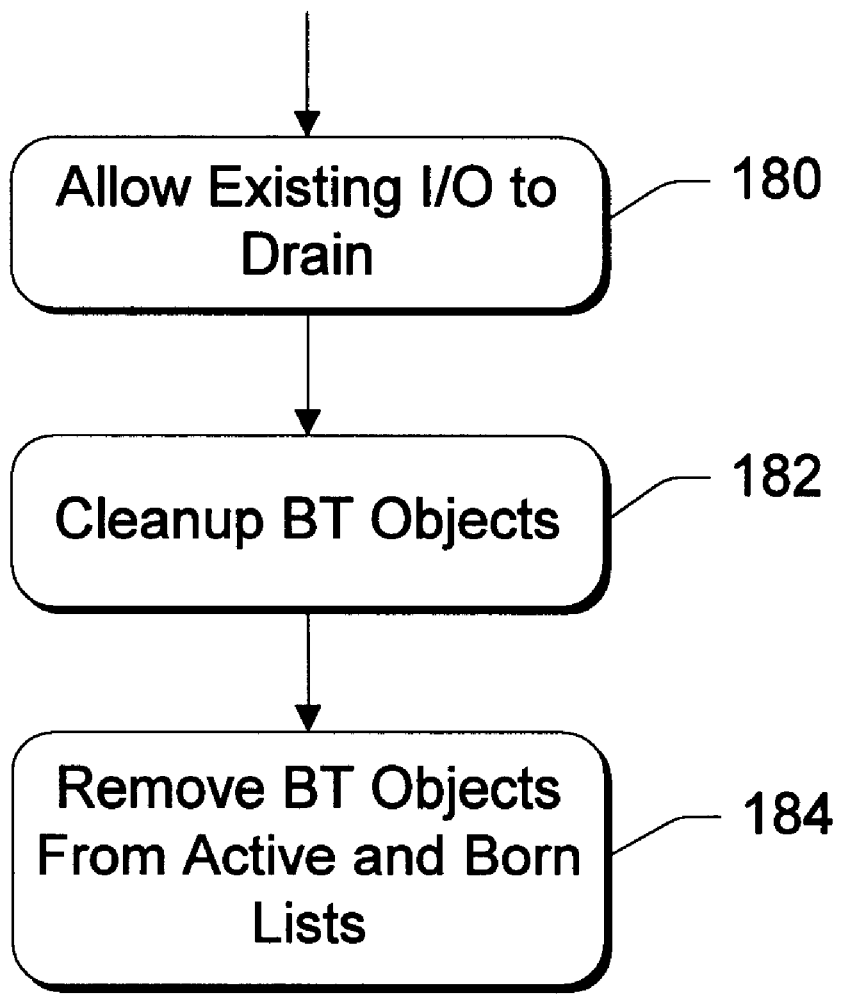
FIG. 11 is a flow diagram showing steps in a method for halting operation of the bandwidth throttling system.

FIG. 11 shows steps in a process for ending the BT system 70. At step 180, all existing I/O operations are permitted to complete. The measuring subsystem 72 and control subsystem 74 cleanup the BT objects (step 182) and remove the BT objects from the active and born lists 76 and 78 (step 184).

The BT system described above is advantageous over prior art bandwidth management techniques because it allows bandwidth control on a per virtual server basis. As a result, the administrator is afforded maximum flexibility at setting fine-tuned throttling policies that impact the virtual services independently of one another.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A bandwidth throttling system for use in a computer network system having at least one network server connected to serve one or more clients over a network, the network server supporting a service that presents multiple virtual services that can be individually requested by the clients via a data transmission network connection of a predetermined bandwidth, the bandwidth throttling system comprising:

a measuring subsystem to measure a presently used bandwidth for individual ones of the virtual services supported by the network server;

multiple bandwidth throttling objects created for corresponding ones of the virtual services, the bandwidth throttling objects tracking the bandwidth presently used by the corresponding virtual services, the bandwidth throttling objects specifying bandwidth thresholds for the corresponding virtual services, each bandwidth threshold indicating a level of I/O activity for an associated virtual service that is effective to trigger throttling actions on requests to the associated virtual service; and a control subsystem to provide a throttling strategy that selectively throttles requests for the virtual services independently on a per virtual service basis according to the presently used bandwidths measured for the virtual services.

2. A bandwidth throttling system for use in a computer network system having at least one network server connected to serve one or more clients over a network, the network server supporting a service that presents multiple virtual services that can be individually requested by the clients via a data transmission network connection of a predetermined bandwidth the bandwidth throttling system comprising:

a measuring subsystem to measure a presently used bandwidth for individual ones of the virtual services supported by the network server;

multiple bandwidth throttling objects created for corresponding ones of the virtual services the bandwidth throttling objects tracking the bandwidth presently used by the corresponding virtual services; and a control subsystem to provide a throttling strategy that selectively throttles requests for the virtual services independently on a per virtual service basis according to the presently used bandwidths measured for the virtual services, the control subsystem maintaining a born list of the bandwidth throttling objects that have been created for the corresponding virtual services and an active list, the control subsystem adding a particular bandwidth throttling object to the active list when the particular bandwidth throttling object is presently receiving requests and removing the particular bandwidth throttling object when the particular bandwidth throttling object ceases to receive requests.

3. A bandwidth throttling module embodied as a computer program on a computer-readable medium, the bandwidth throttling module being implemented in a network server connected to serve one or more clients over a computer network system via a data transmission connection of predetermined bandwidth, the network server supporting a service that presents multiple virtual services that can be individually requested by the clients, the bandwidth throttling module comprising:

a measuring subsystem to measure a presently used bandwidth for a particular virtual service; and a control subsystem to selective throttle requests for the particular virtual service independently of the requests for others of the virtual services based upon the presently used bandwidth.

4. A bandwidth throttling module as recited in claim 3, wherein the control subsystem is configured to throttle:

requests in a first manner for the particular virtual service if the presently used bandwidth measured for the particular virtual service exceeds a first threshold and requests in a second manner for the particular virtual service if the presently used bandwidth measured for the particular virtual service exceeds a second threshold greater than the first threshold.

5. A bandwidth throttling module as recited in claim 3, further comprising a bandwidth throttling object for each of the virtual services to track the bandwidth being presently used by said each of the virtual services.

6. A bandwidth throttling module as recited in claim 5, further comprising a born list to list the bandwidth throttling objects that have been created.

7. A bandwidth throttling module as recited in claim 5, further comprising an active list to list a subset of the created bandwidth throttling objects to identify those bandwidth throttling objects that are presently receiving requests.

8. A bandwidth throttling module as recited in claim 7, wherein the control subsystem is configured to remove a bandwidth throttling object from the active list after the bandwidth throttling object ceases to receive requests.

9. A network server operating system embodied on the computer-readable medium comprising the bandwidth throttling module as recited in claim 3.

10. A bandwidth throttling module embodied as a computer program on a computer-readable medium, the bandwidth throttling module being implemented in a network server connected to serve one or more clients over a computer network system via a data transmission connection of predetermined bandwidth, the network server supporting a service that presents multiple virtual services that can be individually requested by the clients, the bandwidth throttling module comprising:

computer-executable instructions that, when executed, direct a computing device to:

associate a request for a particular virtual service to a bandwidth throttling object representative of the particular virtual service;

track I/O activity for the particular virtual service using the bandwidth throttling object;

process the request;

ascertain a present set of throttling actions based on I/O activity for the particular virtual service; and handle the request according to the present set of throttling actions.

11. A bandwidth throttling module as recited in claim 10, further comprising:

computer-executable instructions that, when executed, direct a computing device to:

assess a current level of I/O activity for the particular virtual service; and update the present set of throttling actions based on the current level of I/O activity.

12. A bandwidth throttling module as recited in claim 10, wherein the bandwidth throttling object specifies a bandwidth threshold indicating a level of I/O activity for the particular virtual service, further comprising:

computer-executable instructions that, when executed, direct a computing device to:

determine whether a current level of I/O activity for the particular virtual service exceeds the bandwidth threshold maintained in the bandwidth throttling object; and selectively apply one set of throttling actions when the I/O activity does not exceed the bandwidth threshold and another set of throttling actions when the I/O activity exceeds the bandwidth threshold.

13. A network server operating system embodied on a computer-readable medium comprising the bandwidth throttling module as recited in claim 10.

14. A network server operating system for execution on a network server that is configured to serve one or more clients over a computer network system via a data transmission connection of predetermined bandwidth, the network server supporting a service that presents multiple virtual services that can be individually requested by the clients, the network server operating system comprising: a bandwidth throttling system to measure bandwidths presently used by individual ones of the virtual services and to selectively throttle requests for the virtual services independently on a per virtual service basis according to the measured bandwidths corresponding to the virtual services, the bandwidth throttling system implementing a throttling strategy that adaptively applies one of the throttling actions comprising allowing a request, delaying the request, and rejecting the request.

15. A network server operating system for execution on a network server that is configured to serve one or more clients over a computer network system via a data transmission connection of predetermined bandwidth, the network server supporting a service that presents multiple virtual services that can be individually requested by the clients, the network server operating system comprising: a bandwidth throttling system to measure bandwidths presently used by individual ones of the virtual services and to selectively throttle requests for the virtual services independently on a per virtual service basis according to the measured bandwidths corresponding to the virtual services, the bandwidth throttling system creating bandwidth throttling objects for corresponding ones of the virtual services, the bandwidth throttling objects tracking the bandwidth presently used by the corresponding virtual services.

16. A network server operating system as recited in claim 15, wherein the bandwidth throttling objects specify bandwidth thresholds for the corresponding virtual services, each bandwidth threshold indicating a level of I/O activity for an associated virtual service that is effective to trigger throttling actions on requests to the associated virtual service.

17. A network server operating system as recited in claim 15, wherein the bandwidth throttling system maintains a born list of the bandwidth throttling objects that have been created for the corresponding virtual services.

18. A network server operating system as recited in claim 15, wherein the bandwidth throttling system maintains an active list containing a subset of the bandwidth throttling objects that are presently receiving requests from the clients.

19. A network server operating system as recited in claim 15, wherein the bandwidth throttling system maintains a born list of the bandwidth throttling objects that have been created for the corresponding virtual services and an active list, the bandwidth throttling system adding a particular bandwidth throttling object to the active list when the particular bandwidth throttling object is presently receiving requests and removing the particular bandwidth throttling object when the particular bandwidth throttling object ceases to receive requests.

20. A computer-executable bandwidth throttling object embodied on a computer-readable medium for execution on a network server that is connected to serve one or more clients over a computer network system via a data transmission connection of predetermined bandwidth, the network server being configured to support a service that presents multiple virtual services that can be individually requested by the clients whereby the bandwidth throttling object is created to represent a particular virtual service, the bandwidth throttling object comprising:

a threshold data field for holding a bandwidth threshold characterizing a level of I/O activity for the particular virtual service;

a measured bandwidth data field for holding a bandwidth that is presently being used by the particular virtual service to accommodate the level of I/O activity; and computer-executable instructions to facilitate access to the data fields to assist in controlling and throttling the bandwidth for the particular virtual service.

21. A bandwidth throttling object as recited in claim 20, further comprising a blocked list data field to hold a collection of requests for the particular virtual service that have been temporarily delayed as a result of a throttling action.

22. A bandwidth throttling object as recited in claim 20, further comprising a statistics data field to hold statistics indicative of how many requests for the particular virtual service are being allowed, blocked, or rejected.

23. A bandwidth throttling object as recited in claim 20, further comprising a histogram data field to hold data indicative of the I/O activity for the is particular virtual service measured at fixed time intervals.

24. A bandwidth throttling object as recited in claim 20, wherein the computer-executable instructions comprises:

instructions that, when executed, direct a computing device to:

set the bandwidth threshold;

get the bandwidth threshold;

update the I/O activity; and get statistics on the measured bandwidth.

25. A method for throttling bandwidth used by a network server that is connected to serve one or more clients over a computer network system via a data transmission connection of predetermined bandwidth, the network server supporting a service that presents multiple virtual services that can be individually requested by the clients, the network server implementing a bandwidth throttling system to measure bandwidths presently used by individual ones of the virtual services and to selectively throttle requests for the virtual services independently on a per virtual service basis according to the measured bandwidths corresponding to the virtual services, the method comprising the step of creating bandwidth throttling objects for corresponding ones of the virtual services to track the bandwidth being presently used by the corresponding virtual services.

26. A method as recited in claim 25, further comprising the step of placing the created bandwidth throttling objects on a born list to identify their existence.

27. A method as recited in claim 25, further comprising the step of placing the bandwidth throttling object on an active list when the bandwidth throttling object is involved in data transfer.

28. A computer-readable medium having computer-executable instructions for performing the step in the method as recited in claim 25.

29. A method for throttling bandwidth used by a network server that is connected to serve one or more clients over a computer network system via a data transmission connection of predetermined bandwidth, the network server supporting a service that presents multiple virtual services that can be individually requested by the clients, the method comprising the following steps:

associating a request for a particular virtual service to a bandwidth throttling object representative of the particular virtual service;

tracking I/O activity for the particular virtual service using the bandwidth throttling object;

processing the request;

ascertaining a present set of throttling actions based on the I/O activity for the particular virtual service;

handling the request according to the present set of throttling actions;

assessing a current level of I/O activity for the particular virtual service; and updating the bandwidth throttling object to reflect the I/O activity.

30. A method for throttling bandwidth used by a network server that is connected to serve one or more clients over a computer network system via a data transmission connection of predetermined bandwidth, the network server supporting a service that presents multiple virtual services that can be individually requested by the clients, the method comprising the following steps:

associating a request for a particular virtual service to a bandwidth throttling object representative of the particular virtual service;

tracking I/O activity for the particular virtual service using the bandwidth throttling object, the bandwidth throttling object specifying a bandwidth threshold indicating a level of I/O activity for the particular virtual service;

determining whether a current level of I/O activity for the particular virtual service exceeds the bandwidth threshold maintained in the bandwidth throttling object;

processing the request; and handling the request by selectively applying one set of throttling actions when the I/O activity does not exceed the bandwidth threshold and another set of throttling actions when the I/O activity exceeds the bandwidth threshold.

* * * * *

UNITED STATES PATENT AND TRADEMARK OFFICE
CERTIFICATE OF CORRECTION

PATENT NO. : 6,222,856 B1
DATED : April 24, 2001
INVENTOR(S) : Murali R. Krishnan It is certified that error appears in the above-identified patent and that said Letters Patent is hereby corrected as shown below:

Column 1,
Line 21, delete "11".

Column 7,
Line 10, delete "to".

Column 12,
Line 42, delete "said each of the virtual services".
Line 42, add -- the associated virtual service -- after "by".
Line 54, change "the" to -- a --.

Column 13,
Line 16, delete "present".

Column 14,
Line 52, delete "is".

Signed and Sealed this

Thirteenth Day of November, 2001

Attest:

NICHOLAS P. GODICI
*Attesting Officer*  *Acting Director of the United States Patent and Trademark Office*